ered Patent [19]

Denis et al.

[11] Patent Number: 4,511,369
[45] Date of Patent: Apr. 16, 1985

[54] COPOLYMERS WITH NITROGEN GROUPS, USEFUL AS ADDITIVES FOR DECREASING THE CLOUD POINT OF HYDROCARBON MIDDLE DISTILLATES AND COMPOSITIONS CONTAINING THEM

[75] Inventors: Jacques Denis, Charbonniere les Baisn; Bernard Sillion, Rocquencourt; Bernard Damin, Oullins; Robert Leger, Grigny, all of France

[73] Assignees: Institut Francais du Petrole, Rueil-Malmaison; Elf France, Paris, both of France

[21] Appl. No.: 550,160

[22] Filed: Nov. 9, 1983

[30] Foreign Application Priority Data

Nov. 9, 1982 [FR] France .................................. 82 18968

[51] Int. Cl.³ .................................................. C10L 1/22
[52] U.S. Cl. ............................................ 44/62; 44/70; 44/71; 44/72; 525/327.6; 525/329.5
[58] Field of Search .......................... 44/62, 70, 71, 72; 525/327.6, 329.5

[56] References Cited
U.S. PATENT DOCUMENTS 4,160,739 7/1979 Stambaugh et al. ..................... 44/62
4,359,325 11/1982 Dawans et al. .................. 525/327.6

*Primary Examiner*—Y. Harris-Smith
*Attorney, Agent, or Firm*—Millen & White; Millen & White

[57] ABSTRACT

Copolymers with nitrogen groups are used as additives to lower the cloud point of middle distillates such as gas oils. They are obtained by reacting a compound having a primary amine group with a copolymer comprising from 20 to 40% of recurrent units from a linear α-olefin, from 30 to 70% of recurrent units from an α,β-unsaturated dicarboxylic compound, from 5 to 30% of recurrent units from an alkyl ester of unsaturated monocarboxylic acid, and from 5 to 15% of recurrent units from styrene or a styrene derivative.

These additives also improve the limit filterability temperature and the pour point of the middle distillates.

19 Claims, No Drawings

COPOLYMERS WITH NITROGEN GROUPS, USEFUL AS ADDITIVES FOR DECREASING THE CLOUD POINT OF HYDROCARBON MIDDLE DISTILLATES AND COMPOSITIONS CONTAINING THEM

BACKGROUND OF THE INVENTION

This invention relates to new nitrogen-containing additives useful as agents for decreasing the cloud point of hydrocarbon middle distillates (fuel oils, gas oils) and to the middle distillates compositions containing said additives.

The oil distillates concerned by the invention consist of middle distillates (fuel oil, gas oil) distilling in the range (ASTM standard D 86-87) of 150° to 450° C. The gas oils more particularly concerned are those whose distillation range extends from an initial temperature between 160° C. and 190° C. to a final temperature between 350° C. and 390° C. these limits being in no way imperative.

A large number of products are marketed as improvers of the limit filtrability temperature and the pour point of oil cuts of high paraffin content, these products being, for example:
  polymers containing long chain olefins
  co-polymers containing alpha-olefins
  ethylene-vinyl acetate copolymers
  N-acyl aminoethylesters of acid-containing polymers, or
  halocarbon compounds These products operate on the crystallization kinetics and modify the crystal size, thereby enabling the use of the suspension at a lower temperature without plugging of the pipes and the filters. The above-mentioned products do not change the temperature at which the first paraffin crystals appear. As a matter of fact it has been considered, up to now, that this temperature depended on the molecular weight and the composition of the paraffins and on the nature of the solvent.

Decreasing the cloud point of middle distillates (particularly gas oils) by means of an additive, would be of particular concern to the refiners since it would enable without modifying the distillation diagram, to meet the specifications, which tend now to become more severe.

It has now been discovered that certain chemical compounds, as hereafter defined, have the property, when added to middle distillation, to decrease the temperature at which the first paraffin crystals appear, as compared to the temperature at which these crystals appear in the absence of these additives. This property is the more unexpected as it is retained after several heating and cooling cycles and its mechanism has not yet been elucidated.

This class of chemical compounds also operates on other properties of middle distillates (particularly gas oils) by modifying the behavior of the medium containing the settled paraffins.

Thus the compounds proposed according to the invention have a substantial effect on the limit filtrability temperature and the pour point.

When paraffin crystals, whose formation results from cooling, have appeared, they normally tend to gather by gravity in the bottom portion of the container. This phenomenon, generally called sedimentation, results in the plugging of pipes and filters and is detrimental to the use of middle distillates and particularly of gas oils. The chemical compounds proposed in the invention are able to substantially decrease the sedimentation rate of the paraffins formed by cooling gas oils and other middle distillates.

Finally, the products proposed for their above-mentioned properties further impart to gas oils and middle distillates to which they are added, anticorrosion properties as concerns metal surfaces.

SUMMARY OF THE INVENTION

As a general rule, the additives of the invention may be defined as polymeric products having an average molecular weight by number of about 1,000 to 10,000, obtained by condensation of one or more compounds containing a primary amine group, as defined hereinafter, with a copolymer comprising:
  (A) recurrent units from at least one linear α-olefin;
  (B) recurrent units derived from at least one α,β-unsaturated dicarboxylic compound, in the form of a diacid, a lower alkyl diester or an anhydride;
  (C) recurrent units from at least one alkyl ester of an unsaturated monocarboxylic acid; and
  (D) recurrent units from styrene and/or at least one of its alkylated, halogenated or methoxylated derivatives.

DETAILED DISCUSSION

More particularly, the above copolymers comprise a proportion of 20 to 40% by mole of recurrent units derived from α-olefins, 30 to 70% by mole of recurrent units derived from unsaturated α,β-dicarboxylic compounds, 5 to 30% by mole of recurrent units derived from alkyl esters of unsaturated monocarboxylic acids and 5 to 15% by mole of recurrent units derived from styrene or its derivatives.

The linear α-olefins forming part of the polymeric composition preferably comprise at least 16 carbon atoms. They are advantageously used as mixtures of linear α-olefins having 20 to 24 carbon atoms, or 24 to 28 carbon atoms, or as cuts comprising about 20% by weight of α-olefins with at most 28 carbon atoms and about 80% by weight of α-olefins with 30 carbon atoms or more. Mostly the linear α-olefin has from 16 to 30 carbon atoms.

The unsaturated α,β-dicarboxylic compounds forming part of the copolymer composition are more particularly dicarboxylic acids such as maleic acid or alkylmaleic acids, for example methylmaleic (or citraconic) acid.

These compounds may also consist of alkyl diesters of these dicarboxylic acids, e.g., lower alkyl diesters particularly the methyl, ethyl or propyl diesters, or even of the anhydrides corresponding to these dicarboxylic acids; for the purpose of the invention, anhydrides are preferred, more particularly maleic anhydride.

The alkyl esters of unsaturated monocarboxylic acids are more particularly the alkyl acrylates and methacrylates with 4 to 30, e.g., 4 to 20 carbon atoms in the alkyl group, e.g. butyl, ethylhexyl, decyl, dodecyl, hexadecyl, octadecyl and eicosyl acrylates. The acrylates and methacrylates of industrial alcohol cuts comprising, as an average, 12 carbon atoms (lauryl acrylate and methacrylate) or 18 carbon atoms (stearyl acrylate and methacrylate), as well as heavier alcohol cuts, with a high content of alcohols having 20 or 22 carbon atoms, can also be mentioned.

The styrene derivatives which can participate in the polymeric composition are more particularly o-methylstyrene, p-methylstyrene, 2,5-dimethylstyrene, o-methoxystyrene, p-methoxystyrene, 2,5-dimethoxystyrene, p-bromostyrene, p-chlorostyrene and 2,5-dichlorostyrene. Within the scope of the invention, styrene is the compound preferably used.

The compound comprising a primary amine group which is condensed with the above-described copolymers to form the additives according to the invention may comply with one of the following two general formulas:

R—Z[(CH$_2$)$_n$NH]$_m$H    (I)

HO—CH$_2$—R''—NH$_2$    (II)

In formula (I) R is a saturated aliphatic monovalent radical comprising 1 to 30 carbon atoms.

Z, according to the case, may be an oxygen atom or a divalent group —NH— or —NR'—, R' being a monovalent, preferably linear, aliphatic radical comprising 1 to 30 carbon atoms, preferably 12 to 24 carbon atoms, n is an integer from 2 to 4 and m is either zero when Z is NH or an integer from 1 to 4 in any case.

The compounds of the above formula (I) may consist of primary amines of the formula R—NH$_2$ (in this case Z in formula (I) is a —NH— group and m is zero). Preferably, the radical R is linear and has 12 to 24 carbon atoms. Specific examples of these amines are:
dodecylamine, tetradecylamine, hexadecylamine, octadecylamine, eicosylamine and docosylamine.

The compounds of formula (I) may also consist of polyamines derived from saturated aliphatic amines and out of the formula:

R—NH[(CH$_2$)$_n$NH]$_m$H corresponding to the general formula (I) wherein Z is a —NH— group, m may range from 1 to 4 and n from 2 to 4, its preferred value being 3.

Preferably the radical R is linear and has 12 to 24 carbon atoms. Specific compounds are: N-dodecyl1,3-diaminopropane, N-tetradecyl1,3-diaminopropane, N-hexadecyl1,3-diaminopropane, N-octadecyl1,3-diaminopropane, N-eicosyl1,3-diaminopropane, N-docosyl1,3-diaminopropane, N-hexadecyldipropylenetriamine, N-octadecyldipropylenetriamine, N-eicosyldipropylenetriamine and N-docosyldipropylenetriamine.

The compounds of formula (I) may also consist of polyamines of the formula:

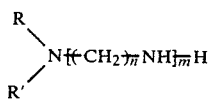

corresponding to the general formula (I) wherein Z is —NR'— and wherein R and R', identical or different, are each an alkyl radical having 1 to 24 and preferably 8 to 22 carbon atoms, R and R' having together preferably from 16 to 32 carbon atoms; n ranges from 2 to 4 and m from 1 to 4.

Specific compounds are N,N-diethyl1,2-diaminoethane, N,N-diisopropyl1,2-diaminoethane, N,N-dibutyl1,2-diaminoethane, N,N-diethyl1,4-diaminobutane, N,N-dimethyl1,3-diaminopropane, N,N-diethyl1,3-diaminopropane, N,N-dioctyl1,3-diaminopropane, N,N-didecyl1,3-diaminopropane, N,N-didodecyl1,3-diaminopropane, N,N-ditetradecyl1,3-diaminopropane, N,N-dihexadecyl1,3-diaminopropane, N,N-dioctadecyl1,3diaminopropane, N,N-didodecyldipropylenetriamine, N,N-ditetradecyldipropylene triamine, N,N-dihexadecyldipropylenetriamine and N,N-dioctadecyldipropylenetriamine.

The compounds of formula (I) according to the invention may also consist of ether-amines, complying more particularly with the formula:

R—O[(CH$_2$)$_n$NH]$_m$H corresponding to the general formula (I) wherein Z is an oxygen atom; the radical R has preferably from 12 to 24 carbon atoms, m is an integer from 1 to 4 and n an integer from 2 to 4, preferably 2 or 3.

Specific ether-amine compounds are: 2-methoxyethylamine, 3-methoxypropylamine, 4-methoxybutylamine, 3-ethoxypropylamine, 3-octyloxypropylamine, 3-decyloxypropylamine, 3-hexadecyloxypropylamine, 3-eicosyloxypropylamine, 3-docosyloxypropylamine, N-(3-octyloxypropyl)1,3diaminopropane, N-(3-decyloxy propyl)1,3 diaminopropane, (2,4,6-trimethyldecyl)3-oxypropylamine and N-[(2,4,6trimethyldecyl)3-oxypropyl]1,3diaminopropane.

The compound with a primary amine group involved in the preparation of the additives according to the invention may also consist of an aminoalcohol of formula (II):

HO—CH$_2$—R''—NH$_2$    (II)

wherein R'' is a linear or branched, preferably linear, divalent saturated aliphatic radical, having 1 to 18 carbon atoms.

Specific examples are:
monoethanolamine, 1-amino3-propanol, 1-amino4-butanol, 1-amino5-pentanol, 1-amino6-hexanol, 1-amino7-heptanol, 1-amino8 octanol, 1-amino10-decanol, 1-amino11-undecanol, 1-amino13-tridecanol, 1-amino14-tetradecanol, 1-amino16-hexadecanol, 2-amino2-methyl1-propanol, 2-amino1-butanol and 2-amino1-pentanol.

It must be understood that, without departing from the scope of the invention, it is possible to use one or more compounds complying with formula (I) and/or one or more compounds complying with formula (II).

The preparation of the additives according to the invention is generally performed in two steps: a first step of preparing the copolymers and a second step of condensing the compound of formula (I) and/or (II) therewith.

The copolymers may be prepared, in the first step, according to conventional techniques of radical promoted polymerization, for example in the presence of an initiator of the azobisisobutyronitrile or peroxide type, dissolved in a hydrocarbon solvent such as, for example, cyclohexane, isooctane, dodecane, benzene, toluene, xylene, diisopropylbenzene, tetrahydrofuran or dioxan.

Hydrocarbon cuts of relatively high boiling range, such as kerosene or gas oil, will be advantageously used.

The solvent, as a general rule, will be used in such an amount that the dry material content by weight be from 25 to 70%, preferably about 60%.

The copolymerization reaction, in the presence of the radical initiator, is performed at a temperature from 70° to 200° C., preferably from 80° to 130° C.

Depending on the operating conditions, the reaction may take from 2 to 14 hours. A copolymer solution is obtained as a viscous liquid of pale yellow colour.

In a second step the coumpound of formula (I) or (II) is condensed with the copolymer formed in the first step, in a conventional manner.

The compound of formula (I) or (II) in a molar proportion corresponding substantially to the proportion of unsaturated diacid, diester or anhydride involved in the copolymer preparation, is added to the copolymer solution obtained as above. This proportion may be, for example, from 0.9 to 1.1 mole of compound (I) or (II) per mole of dicarboxylic compound.

The compound of formula (I) may also be in deficiency to a larger extent, for example, in as low a proportion as 0.5 mole per mole of dicarboxylic compound involved in the copolymer.

The reaction is performed by heating the mixture to a temperature of from 75° to 130° C., preferably between 80° and 100° C., the reaction time being between about 1 and 6 hours, a 2 hour reaction time being usually sufficient. The reaction of the products of formula (I) or (II) with the recurrent units (B) of the copolymer results in the formation of imide groups (succinimides). This reaction also results in the formation of water or alcohol, depending on the type of dicarboxylic reccurent unit (B) (diacid, anhydride or diester). If so desired, the volatile products may be discharged from the reaction mixture, either by scavenging with an inert gas such as, for example, nitrogen, or by azeotropic distillation with the selected solvent.

Another particular manner of synthesizing additives according to the invention consists, in certain cases, of performing a radical promoted copolymerization of one or more alkyl esters of unsaturated monocarboxylic acids with a mixture of α-olefins, styrene, and N-substituted maleimides, the latter being obtained from a prior reaction of compounds of formula (I) or (II) with maleic anhydride or one of its above-mentioned derivatives.

The additives are obtained as a solution in the selected solvent and may be used directly as such in oil middle distillates (particularly gas oils) for improving their cloud point.

Although the mechanism of operation of these additives on the temperature at which the paraffin crystals appear in middle distillates has not yet been clearly elucidated, a substantial improvement of the cloud point of middle distillates treated with these additives has been observed at additive concentrations of, for example, from 0.001 to 1% by weight and, preferably, from 0.01 to 0.2%. The decrease of the cloud point may reach, for example, 5° C. or more.

It is also noteworthy that the additives according to the invention have, in addition to their efficiency in improving the cloud point of middle distillates, the further property of inhibiting the sedimentation of n-paraffins in middle distillates at rest, of improving the limit filtrability temperature and flow temperature and of inhibiting the corrosion of the metal surfaces in contact with said distillates.

The following examples illustrate the invention without limiting the scope thereof.

EXAMPLE 1

A reactor provided with a stirring system, a cooler and an inert gas feed pipe, is fed with 98 g (1 mole) of maleic anhydride, 243 g (0.67 molar equivalent) of an α-olefin cut comprising by mole about 1% of $C_{22}$ olefins, 30% of $C_{24}$ olefins, 39% of $C_{26}$ olefins, 20% of $C_{28}$ olefins and 10% of $C_{30}$ olefins, 97.5 g (0.53 mole) of ethyl-hexyl acrylate and 13.5 g (0.13 mole) of styrene, and 250 ml of solvent formed of an oil cut distilling between 120° and 250° C. are added thereto. The stirred reactor contents are brought to 120° C. and 3.4 g of benzoyl peroxide diluted in a low amount of solvent are added continuously for 8 h with a syringe pump.

There is obtained a copolymer as a pale yellow liquid.

To this solution, in the same reactor, are further added 210 g (corresponding to 0.75 molar equivalent of primary amine) of a cut of primary fatty amines whose alkyl chains distribute, as an average, as follows: 1% of $C_{14}$, 28% of $C_{16}$ and 71% of $C_{18}$ by mole; 200 ml of the solvent described in a/ are then added to obtain a dry material content of about 60% by weight. After 2 hours of heating at 90° C., a pale yellow solution is obtained, whose infra-red spectrum shows the presence of imide bands.

This solution, adjusted with the same solvent to a dry material content of 50% by weight forms the "mother solution" of additive I.

EXAMPLES 2 TO 7

The preparation of the copolymer according to example 1(a) is repeated several times and each of the resultant copolymers is subjected to condensation with compounds having primary amine groups, the operating conditions being those described in 1(b) and the molar proportions being the same as in example 1.

EXAMPLE 2

The copolymer prepared according to 1(a) is condensed with 225 g of a cut of primary fatty amines whose alkyl chains comprise by mole about: 1% of $C_{14}$, 5% of $C_{16}$, 42% of $C_{18}$, 12% of $C_{20}$ and 40% of $C_{22}$. A solution of additive II is thus obtained.

EXAMPLE 3

The condensation with the copolymer prepared in 1(a) is performed with 277.5 g of a N-alkyl1,3-diaminopropane cut formed of amines whose alkyl chains consist as an average, of 1% of $C_{14}$, 28% of $C_{16}$ and 71% of $C_{18}$. The product is additive III.

EXAMPLE 4

The agent condensed with the copolymer 1(a) is 228 g of a cut of N-alkyl1,3-diaminopropane whose alkyl chains consist of about 1% of $C_{14}$, 5% of $C_{16}$, 42% of $C_{18}$, 12% of $C_{20}$ and 40% of $C_{22}$ by mole. The product is additive IV.

EXAMPLE 5

129.75 g (0.75 mole) of 1-amino-10-decanol are condensed with the copolymer obtained in 1(a). The product of this condensation is additive V.

EXAMPLE 6

The fatty amines cut used in example 1(b) is replaced with the same molar proportion (224.25 g) of N-[-(2,4,6-trimethyldecyl)3-oxypropyl]-1,3-diaminopropane. The product is additive VI.

EXAMPLE 7

The fatty amines cut used in example 1(b) is replaced with the same molar proportion (304 g) of N,N- didodecyl1,3-diaminopropane. The resultant condensation product constitutes additive VII.

EXAMPLE 8

The experimental conditions of 1(a) are used to prepare a copolymer which differs from that prepared in 1(a) by the nature of the α-olefin cut. The latter consists of about 1% of $C_8$ olefin, 49% of $C_{20}$ olefin, 42% of $C_{22}$ olefin and 8% of $C_{24}$ olefin; 198.4 g (0.67 molar equivalent) thereof are used. After condensation with the amine cut described in 1(b), additive VIII is obtained.

EXAMPLES 9 TO 13

The experimental conditions of 1(a) are used to prepare copolymers differing from that prepared in 1(a) by the nature and eventually by the molar proportion of the acrylic monomer or of the α-olefin cut.

The same amine cut as used in 1(b) is condensed with these new copolymers, the operating manner and the molar ratios being unchanged.

EXAMPLE 9

The copolymer is prepared with 98 g (1 mole) of maleic anhydride, 243 g (0.67 molar equivalent) of the olefin cut used in example 1, 13.65 g (0.13 mole) of styrene, 135.4 g (0.53 molar equivalent) of a cut of methacrylates of alcohols having the following approximate weight composition: 13% of $C_8$, 15% of $C_{10}$, 28% of $C_{12}$, 20% of $C_{14}$, 14% of $C_{16}$ and 7% of $C_{18}$. The condensation of amines according to 1(b) provides additive IX.

EXAMPLE 10

The copolymer is prepared from the same monomers as in example 9, but the proportions differ: 98 g (1 mole) of maleic anhydride, 243 g (0.67 molar equivalent) of olefins, 16.8 g (0.16 mole) of styrene and 40.8 g (0.16 molar equivalent) of methacrylates. The condensation with amines according to 1(b) provides additive X.

EXAMPLE 11

The copolymer is prepared from 98 g (1 mole) of maleic anhydride, 296.1 g (1 molar equivalent) of the olefin cut of example 8, 26.25 g (0.25 mole) of styrene and 191.25 g (0.75 molar equivalent) of the methacrylate cut of example 9.

The condensation with amines according to 1(b) provides additive XI.

EXAMPLE 12

The copolymer is prepared from 98 g (1 mole) of maleic anhydride, 296.1 g (1 molar equivalent) of the olefin cut of example 8, 26.25 g (0.25 mole) of styrene and 244 g (0.75 molar equivalent) of a cut of methacrylates of alcohols having the following approximate weight composition: 2% of $C_{14}$, 51% of $C_{16}$, 30% of $C_{18}$, 14% of $C_{20}$ and 3% of $C_{22}$.

The condensation with amines according to 1(b) provides additive XII.

EXAMPLE 13

The copolymer is prepared from 98 g (1 mole) of maleic anhydride, 296.1 g (1 molar equivalent) of the olefin cut used in example 8, 16.8 g (0.16 mole) of styrene and 96 g (0.75 mole) of butyl acrylate.

The condensation with amines according to 1(b) provides additive XIII.

The additives described above are obtained as a solution in an oil cut distilling between 120° and 250° C. Their concentration in the solution is generally adjusted to 50% of dry material; the resultant solutions constitute "mother-solutions" of these additives, the activity of which is tested by incorporating a proportion of 0.1% by weight thereof to two gas oil cuts of ARAMCO origin referred to hereinafter as $G_1$ and $G_2$. The characteristics of these cuts are indicated in table 1 below:

TABLE I

| | ASTM DISTILLATION | | % DISTILLED AT 350° C. | VOLUMIC MASS AT 15° C. (kg/l) |
|---|---|---|---|---|
| | IP (°C.) | FP (°C.) | | |
| $G_1$ | 181 | 382 | 89 | 0.846 |
| $G_2$ | 186 | 385 | 87 | 0.847 |

For each of the so-formed compositions, three determinations have been effected:

The cloud point according to the method AFNOR T 60-105

The limit filtrability temperature (LFT) according to the method AFNOR M 07-042

The pour point according to the method AFNOR T 60-105.

The results of these determinations are reported in the following table:

TABLE II

| ADDITIVES | CLOUD POINT (°C.) | | LFT (°C.) | | POUR POINT (°C.) | |
|---|---|---|---|---|---|---|
| | $G_1$ | $G_2$ | $G_1$ | $G_2$ | $G_1$ | $G_2$ |
| none | +2 | +6 | 0 | +3 | −6 | −3 |
| 0.1% I | −2 | +1 | −11 | −8 | −15 | −12 |
| 0.1% II | −1 | +2 | −8 | −9 | −9 | −9 |
| 0.1% III | −2 | +1 | −9 | −11 | −12 | −12 |
| 0.1% IV | 0 | +3 | −8 | −8 | −9 | −9 |
| 0.1% V | −1 | +2 | −6 | −8 | −12 | −9 |
| 0.1% VI | −1 | +2 | −7 | −7 | −9 | −9 |
| 0.1% VII | −2 | +2 | −10 | −9 | −12 | −12 |
| 0.1% VIII | 0 | +3 | −6 | −8 | −9 | −9 |
| 0.1% IX | −2 | +1 | −11 | −9 | −12 | −12 |
| 0.1% X | −2 | +1 | −11 | −8 | −12 | −9 |
| 0.1% XI | −1 | +2 | −8 | −8 | −9 | −9 |
| 0.1% XII | −2 | +1 | −9 | −9 | −12 | −9 |
| 0.1% XIII | 0 | +3 | −6 | −7 | −9 | −9 |

EXAMPLE 14

This example has for object to test the anti-corrosion properties of additive I, of example 1.

Product I has been used in the two above-described gas oils $G_1$ and $G_2$, at a concentration of 0.01% by weight.

The corrosion test consists of evaluating the corrosion induced by synthetic sea water on cylindrical test pieces of steel or polished iron according to standard ASTM D 665 modified as follows: temperature of 32.2° C. and test period of 20 hours.

With the two gas oils $G_1$ and $G_2$ containing no additive, the test pieces have rusted on 100% of their surface and with the two gas oils containing 0.01% by weight of additive, the test pieces have remained intact with 0% of rust.

What is claimed as our invention is:

1. A composition, useful as an additive for decreasing the cloud point of middle distillates, having a number-average molecular weight of 1,000–10,000, and consisting essentially of a copolymer comprising:

20-40% by mole of recurrent units (A) from at least one linear α-olefin;

30-70% by mole of recurrent units (B) from at least one unsaturated α,β-dicarboxylic compound, in the form of a diacid, a lower alkyl diester or an anhydride;

5-30% by mole of recurrent units (C) from at least one alkyl ester of an unsaturated monocarboxylic acid; and 5-15% by mole of recurrent units (D) from styrene and/or at least one of its alkylated, halogenated or methoxlated derivatives, wherein the dicarboxylic units (B) of said copolymer are condensed with at least one compound having a single primary amine group, having the formula:

$$R-Z[(CH_2)_nNH]_mH \quad (I)$$

or $$HO-CH_2-R''-NH_2 \quad (II)$$

wherein R is a monovalent saturated aliphatic radical having 1-30 carbon atoms, Z is O, NH or NR', wherein R' is a monovalent saturated aliphatic radical having 1-30 carbon atoms; n is an integer from 2 to 4; m is zero or an integer from 1 to 4 when Z is NH, or an integer from 1 to 4 when Z is O or NR''; and R'' is a divalent saturated aliphatic radical having 1-18 carbon atoms.

2. A composition according to claim 1, wherein said linear α-olefin providing the recurrent units (A) comprises at least 16 carbon atoms.

3. A composition according to claim 1, wherein said linear α-olefin providing the recurrent units (A) comprises 16 to 30 carbon atoms; the unsaturated α,β-dicarboxylic compound providing the recurrent units (B) is at least one maleic or alkylmaleic acid, a methyl, ethyl or propyl diester thereof or a maleic or alkylmaleic anhydride; the alkyl ester of an unsaturated monocarboxylic acid providing the recurrent units (C) is at least one alkyl acrylate or methacrylate having 4 to 20 carbon atoms in the alkyl group; and the compound providing the recurrent units (D) is styrene.

4. A composition according to claim 1, wherein said compound providing an amine group (I) is at least one linear primary amine having 12-24 carbon atoms.

5. A composition according to claim 1, wherein said compound providing an amine group (II) is at least one amino-alcohol having the formula $$HO-CH_2-R''-NH_2$$

wherein R'' is a linear or branched alkylene radical having 1-18 carbon atoms.

6. A composition according to claim 1, which is obtained by the steps of:
(a) effecting a radical-promoted copolymerization of appropriate proportions of at least one linear α-olefin, at least one unsaturated α,β-dicarboxylic compound in the form of a diacid, a lower alkyl diester or an anhydride, at least one alkyl ester of an unsaturated monocarboxylic acid and styrene and/or at least one styrene derivative; and
(b) condensing the resultant copolymer with at least one compound providing a primary amine group and having the formula (I) or (II), in a proportion of at least about 0.5 mole per mole of α,β-unsaturated dicarboxylic compound in said resultant copolymer.

7. A composition according to claim 6, wherein the proportion of said compound with a primary amine group of formula (I) or (II) ranges from 0.9 to 1.1 per mole of said α,β-unsaturated dicarboxylic compound.

8. A composition according to claim 1, which is obtained by the step of effecting a radical-promoted copolymerization of appropriate proportions of at least one linear α-olefin, at least one α,β-unsaturated dicarboxylic compound, at least one alkyl ester of an unsaturated monocarboxylic acid and styrene and/or at least one styrene derivative, said α,β-unsaturated dicarboxylic compound being at least one N-substituted imide obtained by prior reaction of an α,β-unsaturated dicarboxylic compound, in the form of a diacid, a lower alkyl diester or an anhydride, with at least one compound providing a primary amine group and having said formula (I) or (II).

9. A middle distillate composition, which it comprises a major proportion of middle distillate having a distillation range from 150° to 450° C. and a minor proportion of at least one composition according to claim 1 sufficient to decrease the cloud point thereof.

10. A composition according to claim 1, wherein said compound providing an amine group (I) is at least one polyamine having the formula:

$$R-NH[(CH_2)_nNH]_mH$$

wherein R is a linear alkyl radical having 12-24 carbon atoms, n is an integer from 2 to 4, and m is an integer from 1 to 4.

11. A composition according to claim 1 wherein said compound providing an amine group (I) is at least one polyamine having the formula:

$$R-NR'-(CH_2)_nNH]_mH$$

wherein R and R' are each a linear alkyl radical having 8-24 carbon atoms, R and R' together having 16-32 carbon atoms, n is an integer from 2 to 4, and m is an integer from 1 to 4.

12. A composition according to claim 1, wherein said compound providing an amine group (I) is at least one ether-amine having the formula:

$$R-O-(CH_2)_nNH]_mH$$

wherein R is an alkyl radical having 12-24 carbon atoms, n is an integer from 2 to 4, and m is an integer from 1 to 4.

13. A composition according to claim 10, wherein said polyamine having formula (I) is N-dodecyl1,3-diaminopropane, N-tetradecyl1,3-diaminopropane, N-hexadecyl1,3-diaminopropane, N-octadecyl1,3-diaminopropane, N-eicosyl1,3-diaminopropane, N-docosyl1,3-diaminopropane, N-hexadecyldipropylenetriamine, N-octadecyldipropylenetriamine, N-eicosyldipropylenetriamine or N-docosyldipropylenetriamine.

14. A composition according to claim 11, wherein said polyamine having formula (I) is N,N-diethyl1,2-diaminoethane, N,N-diisopropyl1,2-diaminoethane, N,N-dibutyl1,2-diaminoethane, N,N-diethyl1,4-diamino butane, N,N-dimethyl1,3-diaminopropane, N,N-diethyl1,3-diaminopropane, N,N-dioctyl1,3-diaminopropane, N,N-didecyl1,3-diaminopropane, N,N-didodecyl1,3-diaminopropane, N,N-ditetradecyl1,3-diaminopropane, N,N-dihexadecyl1,3-diaminopropane, N,N-dioctadecyl1,3-diaminopropane, N,N-didodecyldipropylenetriamine, N,N-ditetradecyldipropylenetriamine, N,N-dihexadecyldipropylenetriamine or N,N-dioctadecyldipropylenetriamine.

15. A composition according to claim 12, wherein said ether-amine is 2-methoxyethylamine, 3-methoxypropylamine, 4-methoxybutylamine, 3-ethoxypropylamine, 3-octyloxypropylamine, 3-decylocypropylamine, 3-hexadecyloxypropylamine, 3-eicosyloxypropylamine, 3-docosyloxypropylamine, N-(3-octyloxypropyl)1,3-diaminopropane, N-3(3-decyloxypropyl)1,3-diaminopropane, (2,4,6-trimethyldecyl)3-oxypropylamine or N-[(2,4,6-trimethyldecyl)-3-oxypropyl]1,3-diaminopropane.

16. A method of lowering the cloud point of a middle distillate composition, comprising incorporating in said middle distillate composition an effective cloud point depressant amount of a composition according to claim 1.

17. A method according to claim 16, wherein said effective amount is 0.001–1% by weight.

18. A method according to claim 17, wherein said amount is 0.01–0.2% by weight.

19. A composition according to claim 9, wherein said amount of said cloud point depressant composition is 0.01–0.2% by weight.

* * * * *

UNITED STATES PATENT AND TRADEMARK OFFICE
CERTIFICATE OF CORRECTION

PATENT NO. : 4,511,369
DATED : April 16, 1985
INVENTOR(S) : JACQUES DENIS ET AL

It is certified that error appears in the above-identified patent and that said Letters Patent is hereby corrected as shown below:

Column 9, line 12: reads "methoxlated derivatives."

should read --methoxylated derivatives.--

Column 9, line 26: reads "from 1 to 4 when Z is 0 or NR"; and R" is a divalent"

should read --from 1 to 4 when Z is 0 or NR'; and R" is a divalent--

Signed and Sealed this

Seventeenth Day of September 1985

[SEAL]

Attest:

Attesting Officer

DONALD J. QUIGG

*Commissioner of Patents and Trademarks—Designate*